(12) United States Patent
Kojima

(10) Patent No.: US 11,442,244 B2
(45) Date of Patent: Sep. 13, 2022

(54) IMAGING DEVICE

(71) Applicant: CANON KABUSHIKI KAISHA, Tokyo (JP)

(72) Inventor: Yutaka Kojima, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 8 days.

(21) Appl. No.: 17/205,424

(22) Filed: Mar. 18, 2021

(65) Prior Publication Data
US 2021/0302692 A1 Sep. 30, 2021

(30) Foreign Application Priority Data

Mar. 25, 2020 (JP) ............... JP2020-053989

(51) Int. Cl.
G02B 7/28 (2021.01)
G03B 13/36 (2021.01)

(52) U.S. Cl.
CPC ............ G02B 7/28 (2013.01); G03B 13/36 (2013.01); G03B 2213/025 (2013.01)

(58) Field of Classification Search
CPC .......... G02B 7/28; G02B 7/287; G03B 13/36; G03B 2213/025
See application file for complete search history.

(56) References Cited

U.S. PATENT DOCUMENTS

| | | | |
|---|---|---|---|
| 2002/0057908 A1* | 5/2002 | Otani | G03B 13/02 396/51 |
| 2021/0051265 A1* | 2/2021 | Kimura | G06T 7/73 |
| 2021/0124239 A1* | 4/2021 | Sudo | G06T 7/70 |
| 2021/0223860 A1* | 7/2021 | Fujiwara | G06F 3/013 |
| 2021/0302804 A1* | 9/2021 | Sato | H04N 5/23299 |
| 2021/0306568 A1* | 9/2021 | Inukai | H04N 5/232127 |
| 2022/0019789 A1* | 1/2022 | Mori | G06F 3/017 |

FOREIGN PATENT DOCUMENTS

JP S6161135 A 3/1986

* cited by examiner

Primary Examiner — Shahbaz Nazrul
(74) Attorney, Agent, or Firm — Rossi, Kimms & McDowell LLP

(57) ABSTRACT

An imaging device detects a specific type object in a captured image, detects a position of a line-of-sight of a photographer, and controls so that: in case where the specific type object is not detected in the captured image, a main object to which a specific process should be applied is selected based on a predetermined condition within a first type zone including a detected line-of-sight input position, and in case where the specific type object is detected in the captured image, if the detected line-of-sight input position is included in a second type zone that is larger than the first type zone and includes the specific type object, the specific type object included in the second type zone corresponding to the line-of-sight input position is selected as the main object to which the specific process should be applied, regardless of the predetermined condition.

12 Claims, 6 Drawing Sheets

IMAGING DEVICE

BACKGROUND OF THE INVENTION

Field of the Invention

The present invention relates to control of an imaging device having a line-of-sight detection function and an object-recognizing function.

Description of the Related Art

Conventionally, a camera has been proposed that detects the direction of the line-of-sight of the photographer, or the user, detects which area (position) the photographer is observing in the viewfinder field of view, and controls the image-capturing functions such as automatic focus adjustment. Japanese Patent Application Publication No. S61-61135 discloses a camera that, when the user presses the shutter button, detects the line-of-sight position at the time when the shutter button is pressed, displays this position in the viewfinder, and focuses on the object corresponding to the line-of-sight position.

However, it is difficult to specify the user's intended position by a line-of-sight input with precision. As such, focusing on an object corresponding to the line-of-sight position as described in Japanese Patent Application Publication No. S61-61135 can result in focusing on an object that is not the user's intended object.

SUMMARY OF THE INVENTION

The present invention provides an imaging device that is capable of selecting an object that is more suited to the photographer's intention using a line-of-sight input.

An imaging device according to the present invention includes: an image sensor; and at least one memory and at least one processor which function as: an object-detecting unit configured to detect a specific type object in an image captured by the image sensor, a line-of-sight detection unit capable of detecting a position of a line-of-sight of a photographer, and a control unit configured to control so that: in case where the specific type object is not detected by the object-detecting unit in the image captured by the image sensor, a main object to which a specific process should be applied is selected based on a predetermined condition within a first type zone including a line-of-sight input position detected by the line-of-sight detection unit, and in case where the specific type object is detected by the object-detecting unit in the image captured by the image sensor, if the line-of-sight input position detected by the line-of-sight detection unit is included in a second type zone that is larger than the first type zone and includes the specific type object, the specific type object included in the second type zone corresponding to the line-of-sight input position is selected as the main object to which the specific process should be applied, regardless of the predetermined condition.

Further features of the present invention will become apparent from the following description of exemplary embodiments with reference to the attached drawings.

DESCRIPTION OF THE EMBODIMENTS

External View of Digital Camera 100

Figure 1A:
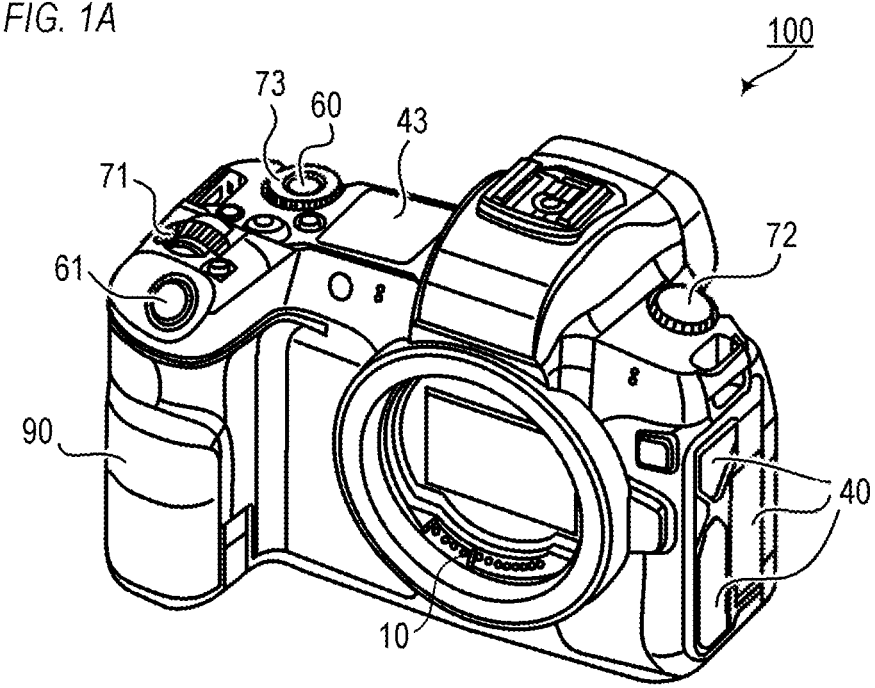
FIGS. 1A and 1B are external views of a digital camera 100.
Figure 1B:
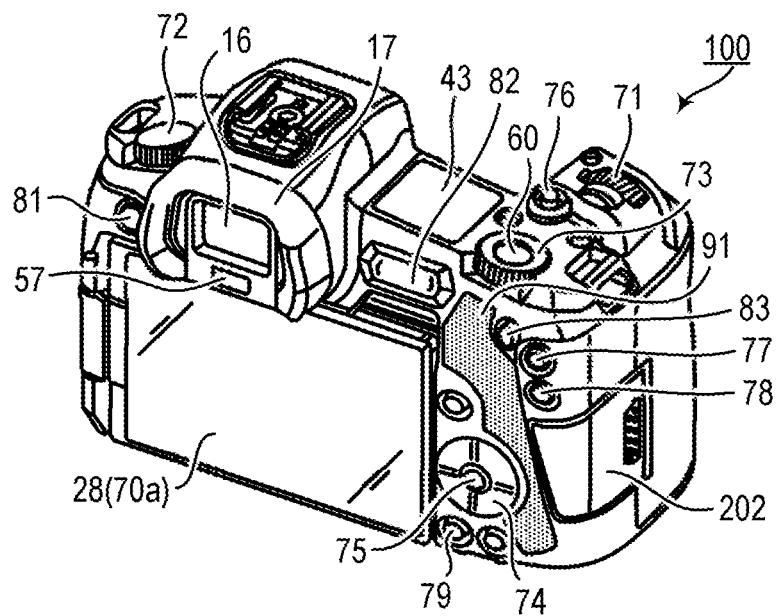

Preferred embodiments according to the present invention are now described with reference to the drawings. FIGS. 1A and 1B are external views of a digital camera 100 as an example of a device (imaging device) to which the present invention is applicable. FIG. 1A is a front perspective view of the digital camera 100, and FIG. 1B is a back perspective view of the digital camera 100.

A display unit 28 is provided on the back side of the digital camera 100 and displays images and various types of information. A touch panel 70a can detect a touch operation on the display surface (touch operation surface) of the display unit 28. An out-of-finder display unit 43 is provided on the upper side of the digital camera 100 and displays various setting values of the digital camera 100, such as a shutter speed and a diaphragm aperture. A shutter button 61 is an operation member for instructing the capturing of images. A mode changeover switch 60 is an operation member for switching between various modes. Terminal covers 40 protect connectors (not shown) to connection cables or the like that connect the digital camera 100 to external devices.

An electronic main dial 71 is a rotational operation member that is rotated to change setting values, such as a shutter speed and a diaphragm aperture. A power switch 72 is an operation member that switches the power of the digital camera 100 on and off. An electronic sub-dial 73 is a rotational operation member that is rotated to perform operations such as moving a selection frame (cursor) and image feeding. A four-way key 74 includes upper, lower, left, and right portions that can be individually pressed to enable a process associated with the pressed portion of the four-way key 74. A SET button 75 is a push-button mainly used to confirm a selected setting item.

A moving-image button 76 is used to instruct to start or stop capturing (recording) of a moving image. An AE lock button 77 is a push-button. Pressing the AE lock button 77 in an image-capturing standby state fixes the exposure state. An enlargement button 78 is an operation button for switching an enlargement mode on and off in a live view display (LV display) in an image-capturing mode. By operating the electronic main dial 71 after switching on the enlargement mode, a live view image (LV image) can be enlarged or reduced. In a playback mode, the enlargement button 78 functions as an operation button for enlarging a playback image or increasing the enlargement ratio of the playback image. A playback button 79 is an operation button for switching between the image-capturing mode and the playback mode. Pressing the playback button 79 in the image-capturing mode changes the mode to the playback mode and displays the latest image among the images stored in a recording medium 200 (described below) on the display unit 28. A menu button 81 is a push-button used for an instruction operation for displaying a menu screen. Pressing the menu button 81 displays on the display unit 28 the menu screen with which various settings can be performed. A user can intuitively perform various settings with the menu screen displayed on the display unit 28, the four-way key 74, and the SET button 75.

A touch bar 82 (multi-function bar or M-Fn bar) is a linear touch operation member (line touch sensor) capable of accepting touch operations. The touch bar 82 is arranged at a position where a touch operation can be performed on the touch bar 82 (where the touch bar 82 is touchable) with the thumb of the right hand while the grip portion 90 is held with the right hand (held with the little finger, ring finger, and middle finger of the right hand) such that the shutter button 61 can be pressed with the index finger of the right hand. That is, the touch bar 82 is arranged at a position where it can be operated by a user who looks into the finder with an eye positioned at the eyepiece 16 and is in a position ready to press the shutter button 61 at any time (image-capturing position). The touch bar 82 is an accepting unit that can accept operations on the touch bar 82 such as a tap operation (an operation involving touching and then releasing the touch without movement within a predetermined time period) and leftward and rightward slide operations (operations involving touching and then moving the touch position while maintaining the touch). The touch bar 82 is an operation member that differs from the touch panel 70a and does not have a display function.

A communication terminal 10 is used by the digital camera 100 to communicate with a lens unit 150, which is attachable and detachable and described below. An eyepiece 16 is an eyepiece of an eyepiece finder 17 (a look-in finder), and the user can visually check, via the eyepiece 16, an image displayed on an internal electronic viewfinder (EVF) 29. An eye-proximity detecting unit 57 is an eye-proximity detecting sensor that detects whether an eye of a user (photographer) is positioned at the eyepiece 16. A lid 202 is a lid of a slot in which the recording medium 200 (described below) is stored. The grip portion 90 is a holding portion shaped to be readily gripped by the right hand of the user to hold the digital camera 100. The shutter button 61 and the electronic main dial 71 are arranged at positions where they are operable with the index finger of the right hand in a state of holding the digital camera 100 with the little finger, ring finger, and middle finger of the right hand gripping the grip portion 90. Additionally, the electronic sub-dial 73 and the touch bar 82 are arranged at positions that are operable with the thumb of the right hand in the same state. A thumb rest portion 91 (a thumb standby position) is a grip member provided at a position on the back side of the digital camera 100 where the thumb of the right hand gripping the grip portion 90 can be readily placed while the right hand is not operating any operation members. The thumb rest portion 91 may be formed by a rubber member to enhance the holding force (grip feeling).

Configuration Block Diagram of Digital Camera 100

Figure 2:
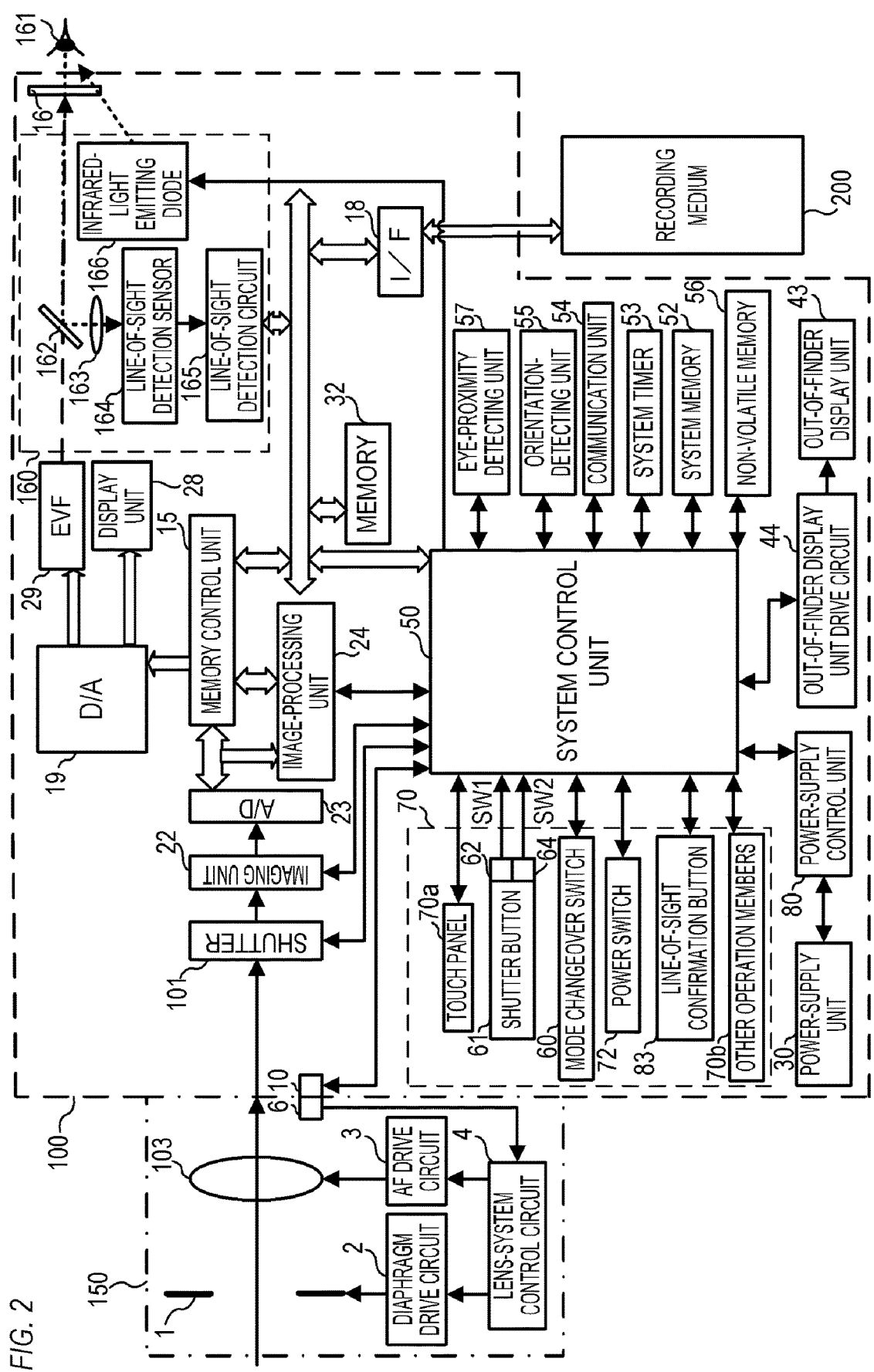
FIG. 2 is a block diagram of the digital camera 100.

FIG. 2 is a block diagram showing a configuration example of the digital camera 100. The lens unit 150 includes replaceable photographing lenses. Lenses 103 usually consist of a plurality of lenses, but FIG. 2 simply shows only one lens. A communication terminal 6 is used by the lens unit 150 to communicate with the digital camera 100, and a communication terminal 10 is used by the digital camera 100 to communicate with the lens unit 150. The lens unit 150 communicates with a system control unit 50 via these communication terminals 6 and 10. The lens unit 150 includes a lens-system control circuit 4, which controls a diaphragm 1 via a diaphragm drive circuit 2. The lens-system control circuit 4 of the lens unit 150 also changes the position of the lens 103 via an AF drive circuit 3 for focusing.

A shutter 101 is a focal-plane shutter that can freely control the exposure time of an imaging unit 22 under the control of the system control unit 50.

The imaging unit 22 is an imaging element (image sensor), which may be a CCD or a CMOS, for converting an optical image into an electric signal. The imaging unit 22 may have an image-plane phase-detection sensor that outputs information on a defocusing amount to the system control unit 50. An A/D converter 23 converts an analog signal output from the imaging unit 22 into a digital signal.

An image-processing unit 24 performs predetermined processes (e.g., pixel interpolation, resizing such as reduction, and color conversion) on data received from the A/D converter 23 or data received from a memory control unit 15. The image-processing unit 24 also performs a predetermined calculation process using the captured image data, and the system control unit 50 performs exposure control and distance measurement control based on the calculation result obtained by the image-processing unit 24. This allows for processing such as through-the-lens (TTL) autofocus (AF) processing, autoexposure (AE) processing, and pre-flashing (EF) processing. The image-processing unit 24 further performs a predetermined calculation process using the captured image data, and performs TTL auto white balance (AWB) processing based on the obtained calculation result.

The output data from the A/D converter 23 is written into a memory 32 via the image-processing unit 24 and the memory control unit 15. Alternatively, the output data from the A/D converter 23 is written into the memory 32 via the memory control unit 15 without going through the image-processing unit 24. The memory 32 stores the image data that is obtained by the imaging unit 22 and converted into digital data by the A/D converter 23, and the image data to be displayed on the display unit 28 and the EVF 29. The memory 32 has a storage capacity sufficient to store a predetermined number of still images, and moving images and audio of predetermined durations.

The memory 32 also serves as a memory for displaying images (video memory). A D/A converter 19 converts image display data stored in the memory 32 into analog signals and feeds the signals to the display unit 28 and the EVF 29. The image data for display written in the memory 32 is thus displayed on the display unit 28 and the EVF 29 via the D/A converter 19. Each of the display unit 28 and the EVF 29 is a display, such as an LCD or an organic EL, and displays images according to the analog signal received from the D/A converter 19. Digital signals that have been subjected to A/D conversion by the A/D converter 23 and accumulated in the memory 32 are converted into analog signals by the D/A converter 19 and sequentially transferred to the display unit 28 or the EVF 29 to be displayed, thereby achieving live view (LV) display. Hereinafter, an image displayed in the live view display is referred to as a live view image (LV image).

The system control unit 50 is a control unit including at least one processor and/or at least one circuit and controls the entire digital camera 100. The system control unit 50 is both a processor and a circuit. The system control unit 50 performs various processes of the present embodiment, which will be described below, by executing a program recorded in a non-volatile memory 56. The system control unit 50 also performs display control by controlling the memory 32, the D/A converter 19, the display unit 28, and the EVF 29, for example.

A system memory 52 may be a RAM, and the system control unit 50 loads data such as the constants and variables for the operation of the system control unit 50 and a program read from the non-volatile memory 56 in the system memory 52.

The non-volatile memory 56 is a memory that is electrically erasable and recordable, such as an EEPROM. The non-volatile memory 56 records constants, a program, and other data for the operation of the system control unit 50. The program is used to perform the process of a flowchart of the present embodiment, which will be described below.

A system timer 53 is a time-measuring unit that measures time used for various controls and the time of the built-in clock.

A communication unit 54 transmits and receives video signals and audio signals to and from an external device connected wirelessly or by cable. The communication unit 54 can also be connected to a wireless local area network (LAN) and the Internet. Additionally, the communication unit 54 can also communicate with an external device via Bluetooth (registered trademark) or Bluetooth Low Energy. The communication unit 54 can transmit images (including LV images) captured by the imaging unit 22 and images recorded on the recording medium 200, and can receive image data and various other types of information from external devices.

An orientation-detecting unit 55 detects the orientation of the digital camera 100 relative to the direction of gravitational force. Based on the orientation detected by the orientation-detecting unit 55, a determination can be made as to whether an image captured by the imaging unit 22 is an image captured while holding the digital camera 100 horizontally or an image captured while holding the digital camera 100 vertically. The system control unit 50 can add information on the direction corresponding to the orientation detected by the orientation-detecting unit 55 to the image file of the image captured by the imaging unit 22 and record a rotated version of the image. The orientation-detecting unit 55 may be an acceleration sensor or a gyro sensor, for example. A motion of the digital camera 100 (such as pan, tilt, lift, or whether it is stationary) can be detected with the acceleration sensor or the gyro sensor serving as the orientation-detecting unit 55.

An eye-proximity detecting unit 57 is an eye-proximity detecting sensor that detects (approach detection) an approach (eye approach) and a separation (eye separation) of an eye (object) with respect to the eyepiece 16 of the eyepiece finder 17 (hereinafter, simply referred to as a "finder"). The system control unit 50 switches between display (displayed state) and hide (hidden state) of the display unit 28 and the EVF 29 in accordance with the state detected by the eye-proximity detecting unit 57. Specifically, when a current state is at least the image-capturing standby state and the display destination is to be automatically switched, while an eye approach is not detected, the display unit 28 is set as the display destination and its display is turned on, and the EVF 29 is hidden. While an eye approach is detected, the EVF 29 is set as the display destination and its display is turned on, and the display unit 28 is hidden.

The eye-proximity detecting unit 57 may be an infrared proximity sensor that is capable of detecting an approach of any object toward the eyepiece 16 of the finder 17 incorporating the EVF 29. When an object approaches, infrared light projected from a light-projecting unit (not shown) of the eye-proximity detecting unit 57 are reflected on the object and received by a light-receiving unit (not shown) of the infrared proximity sensor. It is also possible to determine how close the object is to the eyepiece 16 (eye-proximity distance) based on the amount of infrared light received. In this manner, the eye-proximity detecting unit 57 performs eye-approach detection that detects a distance of approach of an object with respect to the eyepiece 16. In a state in which an eye approach is not detected (non-approach state), an eye approach is detected when an approaching object is detected within a predetermined distance to the eyepiece 16. In a state in which an eye approach is detected (approach state), an eye separation is detected when the object that has been detected in proximity is moved away equal to or beyond the predetermined distance.

A threshold for detecting an eye approach and a threshold for detecting an eye separation may differ from each other by, for example, setting a hysteresis. After an eye approach is detected, it is assumed that a state in which an eye approach is detected is maintained until an eye separation is detected. After an eye separation is detected, it is assumed that a state in which an eye separation is detected is maintained until an eye approach is detected. An infrared proximity sensor is merely an example, and the eye-proximity detecting unit 57 may be other sensors capable of detecting a situation that can be considered as an eye approach.

Various setting values of the camera including a shutter speed and a diaphragm aperture are displayed on the out-of-finder display unit 43 via an out-of-finder display unit drive circuit 44.

A power-supply control unit 80 includes components such as a battery-detecting circuit, a DC-DC converter, and a switching circuit for switching between blocks to be energized, and detects whether a battery is mounted, a type of the battery, a remaining battery level, and the like. Additionally, the power-supply control unit 80 controls the DC-DC converter based on detection results thereof and an instruction from the system control unit 50 and supplies respective units, including the recording medium 200, with necessary voltage for a necessary period of time. A power-supply unit 30 may include a primary battery, such as an alkaline battery or a lithium battery, a secondary battery, such as a NiCd battery, a NiMH battery, or a Li battery, or an AC adapter.

A recording medium I/F 18 is an interface with the recording medium 200, which may be a memory card or a hard disk. The recording medium 200 may be a memory card for recording captured images and include a semiconductor memory or a magnetic disk, for example.

An operation unit 70 is an input unit for accepting an operation by a user (user operation) and is used to input various operation instructions to the system control unit 50. As shown in FIG. 2, the operation unit 70 may include the shutter button 61, the mode changeover switch 60, the power switch 72, the touch panel 70a, a line-of-sight confirmation button 83, and other operation members 70b. The other operation members 70b may include the electronic main dial 71, the electronic sub-dial 73, the four-way key 74, the SET button 75, the moving-image button 76, the AE lock button 77, the enlargement button 78, the playback button 79, the menu button 81, and the touch bar 82.

The shutter button 61 includes a first shutter switch 62 and a second shutter switch 64. The first shutter switch 62 is turned on during an operation of the shutter button 61 by a half-press (image-capturing preparation instruction) and generates a first shutter switch signal SW1. In response to the first shutter switch signal SW1, the system control unit 50 starts image-capturing preparation operations of autofocus (AF) processing, autoexposure (AE) processing, auto white balance (AWB) processing, pre-flashing (EF) processing, and the like.

The second shutter switch 64 is turned on upon completion of an operation of the shutter button 61 by a full-press (image-capturing instruction) and generates a second shutter switch signal SW2. In response to the second shutter switch signal SW2, the system control unit 50 starts a series of operations of an image-capturing process from reading the signal from the imaging unit 22 to writing the captured image into the recording medium 200 as an image file.

The mode changeover switch 60 may switch the operation mode of the system control unit 50 to any of a still-image capturing mode, a moving-image capturing mode, and a playback mode. Modes included in the still-image capturing mode are an automatic capturing mode, an automatic scene determination mode, a manual mode, an aperture priority mode (Av mode), a shutter speed priority mode (Tv mode), and a program AE mode (P mode). Other available modes include various scene modes that constitute image-capturing settings for different image-capturing scenes, and a custom mode. The mode changeover switch 60 allows the user to directly switch to any of these modes. Alternatively, after temporarily switching to a list screen of the image-capturing modes using the mode changeover switch 60, another operation member may be used to selectively switch to any of a plurality of displayed modes. In a similar manner, the moving-image capturing mode may also include a plurality of modes.

The touch panel 70a is a touch sensor that can detect various touch operations on the display surface of the display unit 28 (the operation surface of the touch panel 70a). The touch panel 70a and the display unit 28 can be integrally configured. For example, the touch panel 70a is configured such that the transmittance of light does not obstruct the display by the display unit 28, and is mounted to the upper layer of the display surface of the display unit 28. Then, input coordinates on the touch panel 70a and display coordinates on the display surface of the display unit 28 are associated with each other. This provides a graphical user interface (GUI) that allows the user to feel as if a screen displayed on the display unit 28 can be directly manipulated.

The system control unit 50 is capable of detecting the following operations to the touch panel 70a and the following states of the touch panel 70a.

A new touch on the touch panel 70a by a finger or a stylus previously not in touch with the touch panel 70a or, in other words, a start of a touch (hereinafter referred to as a touch-down)

A state where the touch panel 70a is being touched by a finger or a stylus (hereinafter referred to as a touch-on)

A finger or a stylus moving while in touch with the touch panel 70a (hereinafter referred to as a touch-move)

A separation (release) from the touch panel 70a by a finger or a stylus previously in touch with the touch panel 70a or, in other words, an end of a touch (hereinafter referred to as a touch-up)

A state where nothing is touching the touch panel 70a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as the position coordinates where a finger or a stylus touches the touch panel 70a through an internal bus. Based on the notified information, the system control unit 50 determines what type of operation (touch operation) has been performed on the touch panel 70a. For a touch-move, a movement direction of a finger or a stylus moving on the touch panel 70a can also be determined for each of a vertical component and a horizontal component on the touch panel 70a based on the change in the position coordinates. When a touch-move of a predetermined distance or more is detected, it is determined that a slide operation has been performed. An operation involving quickly moving a finger on the touch panel 70a for a certain distance while keeping the finger in touch with the touch panel 70a and then releasing the finger is referred to as a flick. In other words, a flick is an operation in which a finger quickly traces the surface of the touch panel 70a as though flicking at the touch panel 70a. A determination that a flick has been performed can be made (a determination that a flick has occurred following a slide operation can be made) when a detection of a touch-move of a predetermined distance or more at a predetermined speed or more is followed by a detection of a touch-up. Furthermore, a touch operation involving touching (multi-touching) a plurality of locations (for example, two points) at the same time and bringing the touch positions close to each other is referred to as a pinch-in, while a touch operation in which the touch positions are distanced from each other is referred to as a pinch-out. A pinch-out and a pinch-in are collectively referred to as a pinch operation (or, simply, a pinch). The touch panel 70a may adopt any touch panel system among various systems including a resistive film system, a capacitance system, a surface acoustic wave system, an infrared system, an electromagnetic induction system, an image recognition system, and an optical sensor system. The touch panel 70a may use either a system in which a touch is detected when contact is made with the touch panel, or a system in which a touch is detected when a finger or a stylus approaches the touch panel.

A line-of-sight detection block 160 detects a line-of-sight to determine whether the user's eye that is positioned at the eyepiece 16 is looking at the EVF 29, and if so, where the user is looking. The line-of-sight detection block 160 includes a dichroic mirror 162, an image-forming lens 163, a line-of-sight detection sensor 164, an infrared-light emitting diode 166, and a line-of-sight detection circuit 165.

The infrared-light emitting diode 166 is a light-emitting element and irradiates the user's eyeball (eye) 161 positioned at the eyepiece 16 with infrared light. The infrared light emitted from the infrared-light emitting diode 166 is reflected on the eyeball (eye) 161, and the reflected infrared light reaches the dichroic mirror 162. The dichroic mirror 162 reflects only infrared light and transmits visible light. The reflected infrared light whose optical path has been changed is imaged on the imaging surface of the line-of-sight detection sensor 164 via the image-forming lens 163. The image-forming lens 163 is an optical member that constitutes a line-of-sight detection optical system. The line-of-sight detection sensor 164 includes an imaging element such as a CCD image sensor. The line-of-sight detection sensor 164 photoelectrically converts the incident reflected infrared light into an electric signal and outputs it to the line-of-sight detection circuit 165. The line-of-sight detection circuit 165 includes at least one processor, detects the user's line-of-sight position from the image or movement of the user's eyeball (eye) 161 based on the output signal from the line-of-sight detection sensor 164, and outputs the detection information to the system control unit 50.

In the present embodiment, the line-of-sight detection block 160 detects a line-of-sight by a method called pupil center corneal reflection. The pupil center corneal reflection method detects the direction and position of a line-of-sight based on the positional relationship between the pupil of the eyeball (eye) 161 and the reflected infrared light that is emitted from the infrared-light emitting diode 166 and reflected on the eyeball (eye) 161, the cornea in specific. There are various other methods to detect the direction and position of a line-of-sight, including the limbus tracking method that uses the difference in light reflectance between the pupil and the while of the eye. In addition to the methods described above, any line-of-sight detection method may be used that can detect the direction and position of a line-of-sight. In the present embodiment, the light-projecting unit and the light-receiving unit of the eye-proximity detecting unit 57 are provided separately from the infrared-light emitting diode 166 and the line-of-sight detection sensor 164. However, the present invention is not limited to this, and the infrared-light emitting diode 166 may double as the light-projecting unit of the eye-proximity detecting unit 57, and the line-of-sight detection sensor 164 may double as the light-receiving unit.

The system control unit 50 can detect the following operations and states based on the output from the line-of-sight detection block 160.

A line-of-sight of the user whose eye is positioned at the eyepiece 16 is newly input (detected). That is, a line-of-sight input is started.

A line-of-sight input of the user whose eye is positioned at the eyepiece 16 is present.

The user whose eye is positioned at the eyepiece 16 is gazing.

The line-of-sight of the user whose eye is positioned at the eyepiece 16 that has been input is removed. That is, the line-of-sight input is ended.

A state in which the user whose eye is positioned at the eyepiece 16 inputs no line-of-sight.

The "gazing" used herein refers to a situation in which the user keeps looking at substantially the same position for some time. In one example of gaze determination, the user is determined to be gazing when the line-of-sight position of the user moves only within a predetermined movement amount for a predetermined time period (e.g., about 0.5 seconds). The predetermined time period may be set by the user, may be a fixed time period, or may be changed depending on the distance between the most recent line-of-sight position and the current line-of-sight position. For example, based on the detection information received from the line-of-sight detection circuit 165, the system control unit 50 may determine that the user is gazing when a state in which the line-of-sight of the user is detected at substantially the same position (state without line-of-sight movements) has continued longer than a predetermined time period (threshold time period). In another example, the system control unit 50 determines the state without line-of-sight movements when the average position of the detected positions of line-of-sight in a short time period is within a predetermined range and also the variation (dispersion) is less than a predetermined value. The short time period used herein is shorter than or equal to the threshold time period described above and includes the latest detection timing.

The line-of-sight confirmation button 83 is an operation member in the operation unit 70, and is a push-button used to instruct the confirmation or cancellation of selection of an object based on the line-of-sight position (line-of-sight input position). The line-of-sight confirmation button 83 is arranged at a position where it can be easily operated while the user looks into the finder 17 (while the eye is positioned at the eyepiece 16). That is, the line-of-sight confirmation button 83 is located at a position where it can be operated with the thumb of the right hand holding the grip portion 90.

The system control unit 50 may set, according to a user operation on the operation unit 70 for example, absolute-position specification or relative-position specification as the method for specifying the target position (e.g., AF position (position of the AF frame)) by a touch operation. For example, the system control unit 50 switches the specification method from absolute-position specification to relative-position specification in response to an eye approach to the eyepiece 16, and switches the specification method from relative-position specification to absolute-position specification in response to an eye separation from the eyepiece 16. An example in which the target is the AF frame is now described. In absolute-position specification, when a touchdown is performed on the touch panel 70a, the AF position associated with the touchdown position (coordinate input position) is set regardless of the AF position that was set before the touchdown (current AF position). That is, the position coordinates (input coordinates) at which the touch operation is performed are associated with the position coordinates (display coordinates) of the display unit 28. In contrast, in relative-position specification, the position coordinates at which the touch operation is performed are not associated with the position coordinates of the display unit 28. In relative-position specification, regardless of the touchdown position, the AF position is moved from the AF position that was set before the touchdown (current AF position) by the distance corresponding to the movement amount of a touchmove in the movement direction of the touchmove.

As the AF frame selection mode (focus area selection mode, AF method), the user can select and preset at least one of a plurality of selection modes including the following selection modes from the setting menu.

Single-point AF: A mode in which the user sets a focus point (single-point AF frame) for focusing (AF) at any one of 191 focus points (focus adjustment areas). The focus detection and AF are performed for the set AF frame by image-plane phase-detection AF or contrast AF. The focus adjustment area used in this mode is smaller than that in zone AF described below.

Zone AF: A selection mode in which a plurality of focus points are grouped into a plurality of focus zones (focus adjustment areas) and the user selects one of the focus zones. Automatic-selection AF is performed using all focus points in the selected zone. A zone may be selected using a line-of-sight input. Among the objects in the selected zone that are subjected to distance measurement at focus points, automatic-selection AF performs AF on the object that is determined as the object to be automatically focused based on the automatic-selection condition. Basically, AF is performed to focus on the object at the closest distance, but conditions such as the position of the object on the screen, the size of the object, and the object distance may also be considered. This mode allows for easier capturing of an object than single-point AF, facilitating focusing when capturing an image of a moving object. Moreover, since the focus zone is narrowed down, this mode avoids focusing on an object at an unintended position in the composition.

Automatic-selection AF: A mode in which the above-mentioned automatic-selection AF is performed using all focus points. The focus point used for AF is automatically determined from all focus points without the user selecting an AF area.

Face+tracking priority AF (face+tracking AF): A selection mode in which, when a face is detected in the LV image, the face is automatically tracked as the AF target and AF is performed, and when a face is not detected, an AF position is determined by automatic-selection AF and AF is performed. When a plurality of faces is detected in the LV image, an AF frame (face-tracking frame) is initially displayed on the face determined by automatic selection, and then the user can move the tracking target to a face on the right or left by operating the four-way key 74 or the AF-ON button to the right or left. The user can also touch the display unit 28 to select a face or an object other than a face as the tracking target, on which tracking and AF are performed.

In zone AF, the determination on the main object to be focused within the zone is automatically performed based on the automatic-selection condition as described above. The automatic-selection condition may be a condition that a score is greater than or equal to a predetermined threshold value, or the highest. This score is obtained through weighting using at least one of element conditions as the following examples.

The object is a detected human face.
The size of the face is large.
The position of the face is close to the digital camera 100 (on the close-range side).
The position of the face is close to the center of the image.
The object is the face of a pre-registered person.
The object is close to the digital camera 100 (on the close-range side).
The object has a high contrast.
The object is a characteristic object such as an animal or a vehicle.
The object is a moving object.

That is, the automatic-selection condition is a condition for increasing a priority to be selected as the main object, and is a condition that an object is at least one of an object that is on the close-range side, an object that is close to the center of the image, an object having a high contrast, a moving object, and a vehicle, for example.

In the present embodiment, when one of the zones set by default is selected by a line-of-sight, the main object is selected within the zone based on the automatic-selection condition. When a face is detected in the live view (hereinafter referred to as LV) image, a zone larger than the default zone is set corresponding to the detected face. Then, when the zone corresponding to the face is selected by a line-of-sight, the corresponding face is set as the main object. Referring to display examples of the EVF 29 shown in FIGS. 3A to 3H and the flowchart of FIG. 4, this process is described below.

Image-Capturing Mode Process

Figure 4:
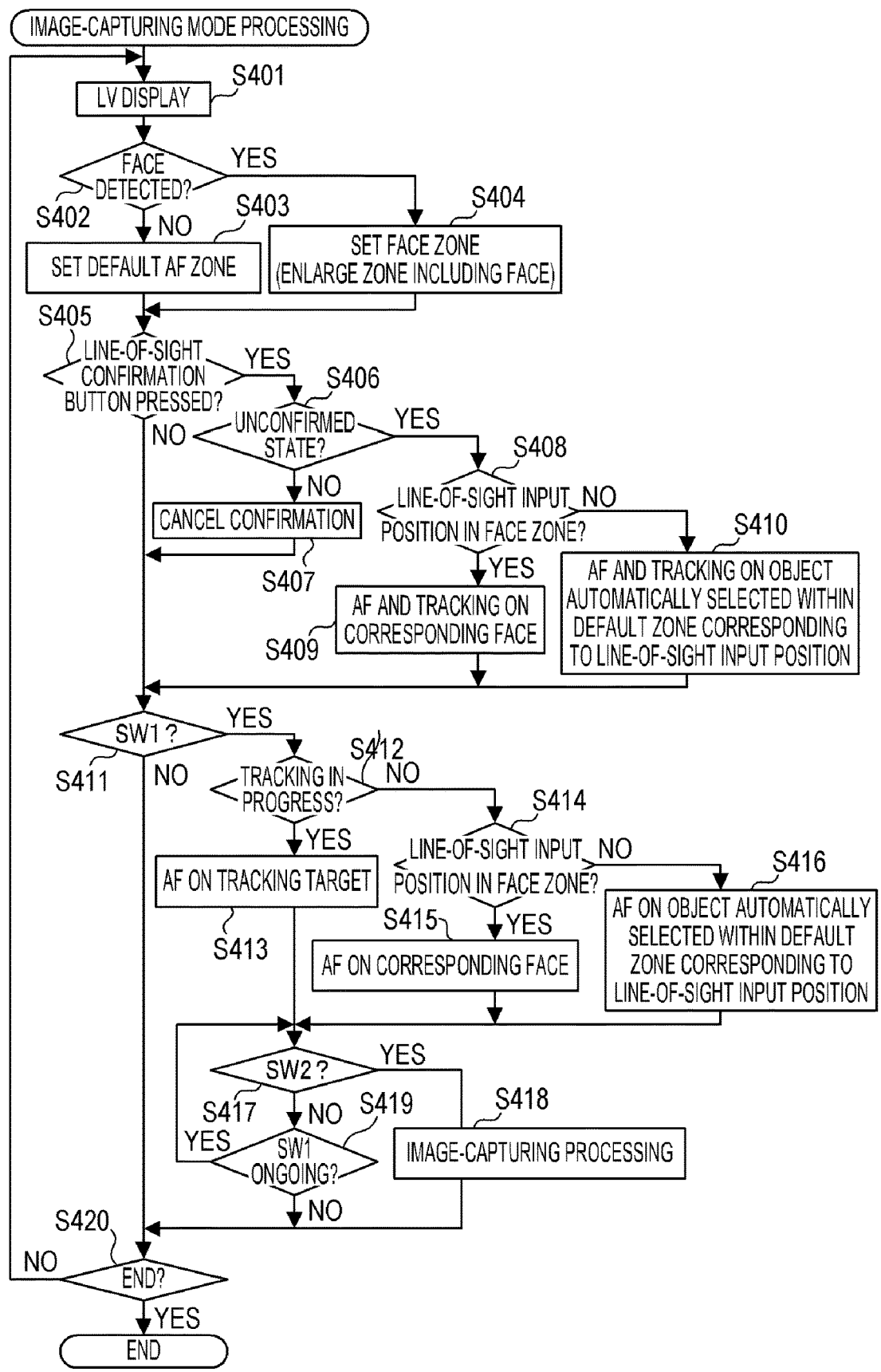
FIG. 4 is a flowchart of an image-capturing mode process.

FIG. 4 shows a flowchart of the image-capturing mode process of the digital camera 100. This process is performed when a program recorded in the non-volatile memory 56 is loaded into the system memory 52 and executed by the system control unit 50. In the description of the present embodiment below, a situation is used as an example in which the user's eye is positioned, the EVF 29 is set as the display destination, the line-of-sight detection function is enabled, and the line-of-sight detection block (line-of-sight detection unit) 160 is performing the operation of detecting a line-of-sight. The description of other situations is omitted. When the digital camera 100 is activated in image-capturing mode, the process of FIG. 4 starts.

At S401, the system control unit 50 starts capturing an image with the imaging unit 22 and displays the captured LV image on the EVF 29.

At S402, the system control unit 50 determines whether the image-processing unit 24 has detected a human face in the LV image. If a face has been detected, the process proceeds to S404. If not, the process proceeds to S403.

At S403, the system control unit 50 defines and sets default zones as zones for zone AF, and displays frames indicating the zones.

Figure 3A:
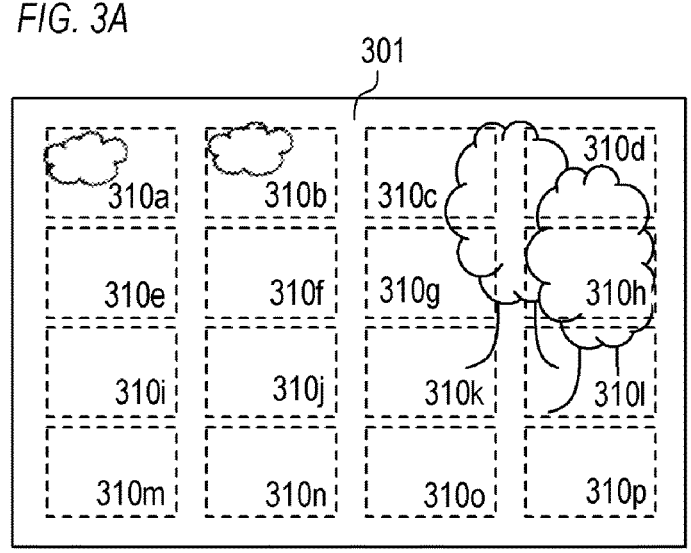
FIGS. 3A to 3H are diagrams showing display examples of an EVF 29.

FIG. 3A shows a display example of the default zones. An LV image 301 is displayed on the EVF 29. In addition, 16 default zones 310*a* to 310*p*, each having a predetermined first size, are arranged in four rows and four columns. These number, size, and arrangement of the zones are examples, and other numbers, sizes, and arrangements may be used.

At S404, the system control unit 50 sets a face zone, which corresponds to the face and is larger than the default zone, and displays a zone frame.

Figure 3B:
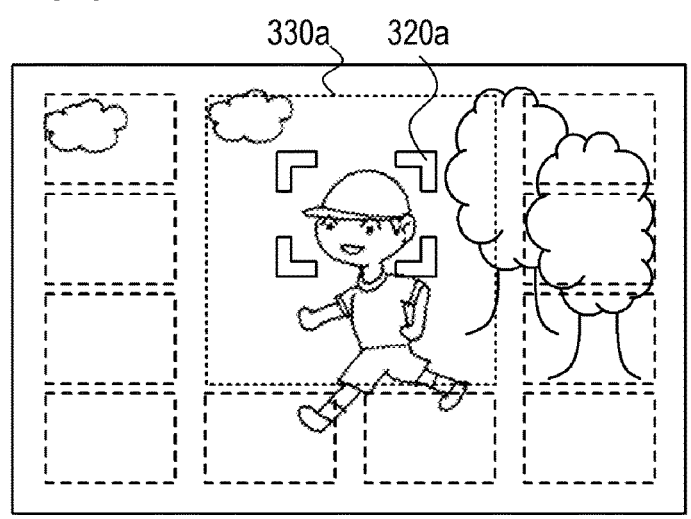

FIG. 3B shows a display example of a face zone that is set when a single face is detected. In the LV image of FIG. 3B, a single face is detected and a face frame 320*a* is displayed. As such, a face zone 330*a*, which includes the face and has a second size larger than the default zone, is set. The face zone 330*a* is a zone corresponding to the face in the face frame 320*a*. In addition, the face zone 330*a* is a zone in which the default zones 310*b*, 310*c*, 310*f*, 310*g*, 310*j*, and 310*k* are combined (included). Default zones are set at positions other than where the face zone 330*a* is set.

Figure 3C:
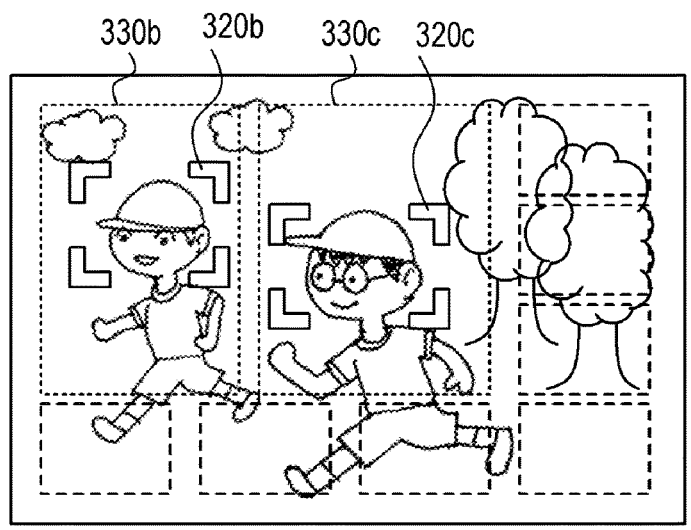
Figure 3D:
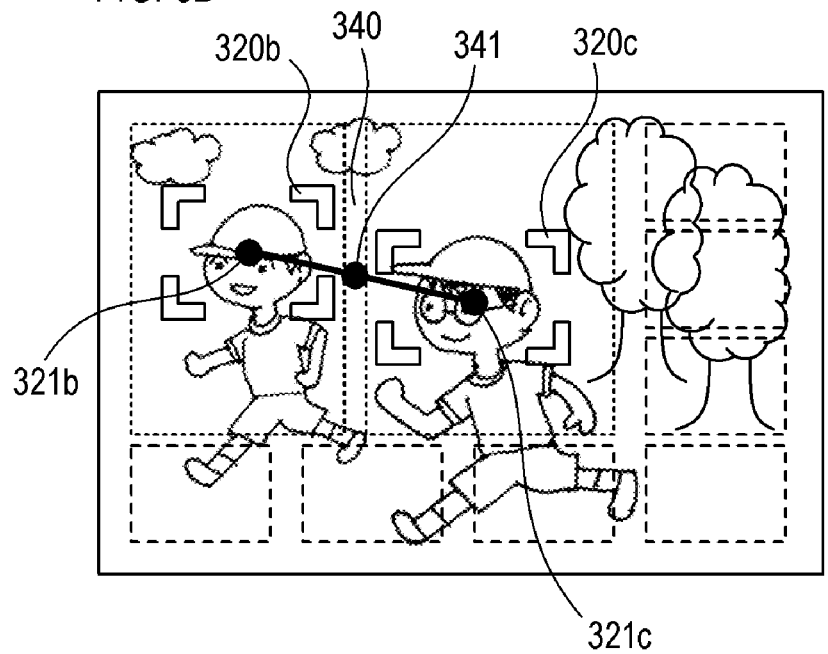

FIG. 3C shows a display example of face zones set when two faces are detected. When a plurality of faces is detected, the present embodiment sets a face zone for each of the faces. In the LV image of FIG. 3C, faces of two people, Person b and Person c, are detected, and a face frame 320*b* and a face frame 320*c* are displayed. Accordingly, face zones 330*b* and 330*c*, each including a face and being larger than the default zone, are set. The face zone 330*b* is a zone corresponding to the face in the face frame 320*b*. The face zone 330*c* is a zone corresponding to the face in the face frame 320*c*. Default zones are set at positions other than where the face zones 330*b* and 330*c* are set. The boundary position between the adjacent face zones 330*b* and 330*c* is set at the midpoint between the center position of the face (face frame 320*b*) corresponding to the face zone 330*b* and the center position of the face (face frame 320*c*) corresponding to the face zone 330*c*. Specifically, as shown in FIG. 3D, the boundary position 340 of the face zones 330*b* and 330*c* is set at the midpoint 341 on a line connecting the midpoint 321*b* of the face frame 320*b* corresponding to the face zone 330*b* and the midpoint 321*c* of the face frame 320*c* corresponding to the face zone 330*c*. This allows the AF zones to be set without biasing either of the two faces. When three or more faces are detected, three or more face zones are set for the respective faces in the same manner.

In the above example, the size of the face zone is approximately an integral multiple of the size of the default zone. However, the size may be changed according to the size of the detected object. In this case, the size of the face zone is larger than the detection size of the corresponding face. In addition, the size of the face zone may be changed according to the moving speed of the detected object, or to the angular speed in the panning of the digital camera 100 tracking the object (framing performed by the user), for example.

At S405, the system control unit 50 determines whether the line-of-sight confirmation button 83 has been pressed (whether an operation has been performed to instruct the confirmation of the main object selected based on the line-of-sight input position). If the line-of-sight confirmation button 83 has been pressed, the process proceeds to S406. If not, the process proceeds to S411.

At S406, the system control unit 50 determines whether the digital camera 100 is in an unconfirmed state, in which the main object has not yet been determined (a state in which the tracking target has not yet been specified). If it is in the unconfirmed state, the process proceeds to S408. If not (if the digital camera 100 is in a confirmed state, in which the main object has already been determined and a tracking target is specified and being tracked), the process proceeds to S407.

At S407, the system control unit 50 cancels the confirmed state to change the state to the unconfirmed state. This cancels the tracking of the tracked object and establishes a state in which a tracking target is not specified.

At S408, the system control unit 50 determines whether the position of line-of-sight (line-of-sight input position) detected by the line-of-sight detection block 160 is in a face zone. If the line-of-sight is in a face zone, the process proceeds to S409. If not (when the line-of-sight input position is in one of the default zones), the process proceeds to S410.

At S409, the system control unit 50 sets the face corresponding to the face zone including the line-of-sight input position as the main object. At this time, the main object is set irrespective (regardless) of the automatic-selection condition described above. Then, AF is performed on the face of the main object. In addition, tracking starts with the face of the main object as the tracking target. The confirmed state described above is thus established.

Figure 3E:
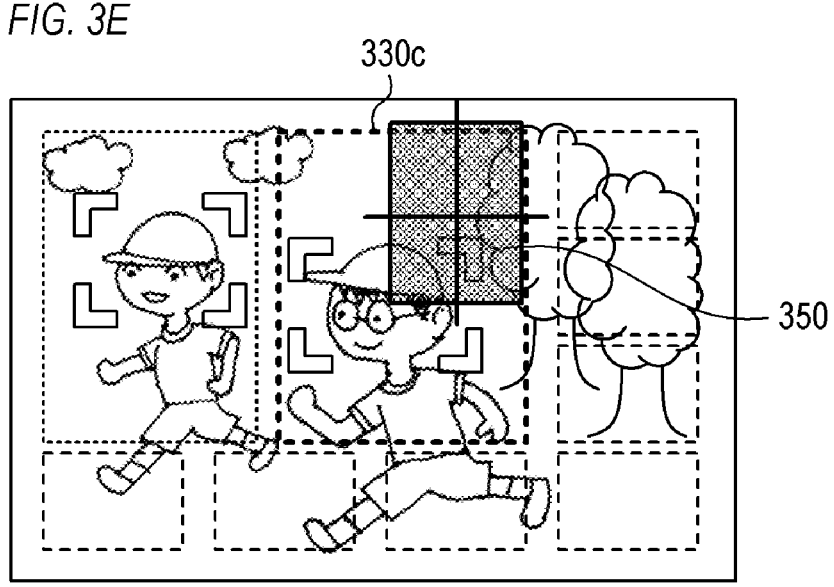

As shown in FIG. 3E, when the line-of-sight confirmation button 83 is pressed while the center of the line-of-sight pointer 350 indicating the line-of-sight input position is in the face zone 330c, the face in the face frame 320c corresponding to the face zone 330c is set as the main object. Thus, the display shifts from FIG. 3E to FIG. 3F in response to the pressing on the line-of-sight confirmation button 83, the face in the face frame 320c becomes the tracking target, the tracking frame 302 is displayed, AF is performed, and tracking starts. In this manner, inputting a line-of-sight in the face zone 330c, which is larger than the default zone, selects the corresponding face. Thus, the user's intended object can be easily selected by roughly specifying the position by a line-of-sight. The human line-of-sight has a characteristic called fixational eye movements, in which the eyeball undergoes fine movements while gazing at a certain point. For this reason, an attempt to specify the exact position with only a line-of-sight input would fail to specify the user's intended position, causing the user to be annoyed by the operation. In contrast, the present embodiment limits such annoyance.

At S410, the system control unit 50 sets the main object based on the above-mentioned automatic-selection condition within the default zone including the line-of-sight input position. Then, AF is performed on the main object. In addition, tracking starts with the main object as the tracking target. As a result, the confirmed state described above is established.

At S411, the system control unit 50 determines whether the shutter button 61 is pressed halfway and the first shutter switch 62 is turned on, that is, whether the first shutter switch signal SW1 has been issued. If the first shutter switch signal SW1 has been issued, the process proceeds to S412 If not, the process proceeds to S420.

At S412, the system control unit 50 determines whether the tracking of an object is in progress. If tracking is in progress, the process proceeds to S413. If not, the process proceeds to S414.

At S413, the system control unit 50 performs AF on the tracking target. In this case, the object being tracked becomes the AF target, irrespective of the line-of-sight input position.

At S414, the system control unit 50 determines whether the line-of-sight position (line-of-sight input position) detected by the line-of-sight detection block 160 is in a face zone. If the line-of-sight is in a face zone, the process proceeds to S415. If not (when the line-of-sight input position is in one of the default zones), the process proceeds to S416.

At S415, the system control unit 50 sets the face corresponding to the face zone including the line-of-sight input position as the main object, and performs AF on the face of the main object. At this time, the main object is set irrespective of the automatic-selection condition described above.

At S416, the system control unit 50 sets the main object based on the above-mentioned automatic-selection condition within the default zone including the line-of-sight input position. Then, AF is performed on the main object.

At S417, the system control unit 50 determines whether the shutter button 61 is fully pressed and the second shutter switch 64 is turned on, that is, whether the second shutter switch signal SW2 has been issued. If the second shutter switch signal SW2 has been issued, the process proceeds to S418 If not, the process proceeds to S419.

At S418, the system control unit 50 performs the above-mentioned series of image-capturing process from the exposure and capturing by the imaging unit 22 to writing the obtained image file into the recording medium 200.

At S419, the system control unit 50 determines whether the shutter button 61 is still pressed halfway and the first shutter switch 62 remains on, that is, whether the issuing of the first shutter switch signal SW1 is ongoing. If the issuing is ongoing, the process proceeds to S417. If not, the process proceeds to S420.

At S420, the system control unit 50 determines whether an end event, which may be powering off or an instruction to shift to the playback mode, has been performed. If an end event has been performed, the process of FIG. 4 ends. If not, the process returns to S401, and the process is repeated.

According to the present embodiment described above, when a face is detected, a desired face can be easily and reliably selected by specifying an approximate position by a line-of-sight. In the present embodiment described above, human faces are used as examples of objects of a specific type, and the zones corresponding to the human faces are enlarged. However, a human face is only an example, and other types of objects that can be detected in an LV image, such as the eyes of a face, animal faces, vehicles, and moving objects, may be handled in the same manner as the above-mentioned human faces, and a larger zone may be set corresponding to an object to facilitate the selection of the object as the main object by a line-of-sight.

Furthermore, the embodiment described above is an example in which a zone frame is displayed on the EVF 29 for each default zone and face zone to allow the user to recognize them, but the zone frame does not necessarily have to be displayed. That is, the zone division may be performed internally, and the main object may be set according to such division and a line-of-sight.

The above embodiment is also an example in which the main object is selected in response to an operation on a specific operation member, such as the line-of-sight confirmation button 83 or the first shutter switch 62, but the present disclosure is not limited to this. For example, the detection of line-of-sight may be performed continuously, and the main object may be constantly selected or changed according to the current line-of-sight. In the example described above, the specific process performed on the main object is AF and tracking, but only one of these may be performed, or a process other than AF and tracking may be performed.

Figure 3F:
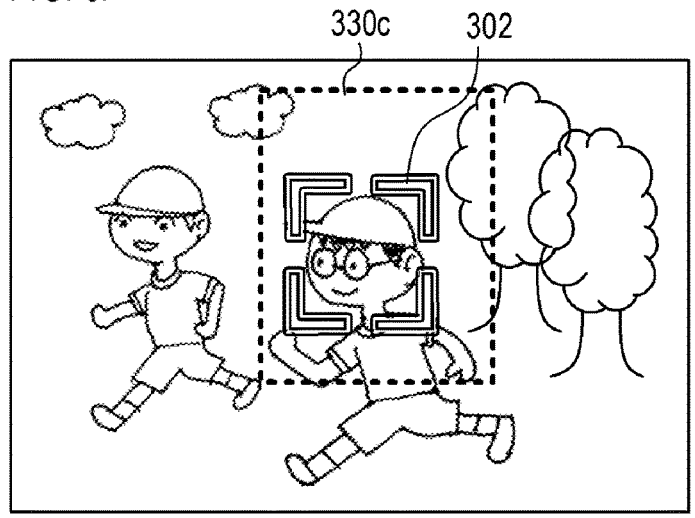
Figure 3G:
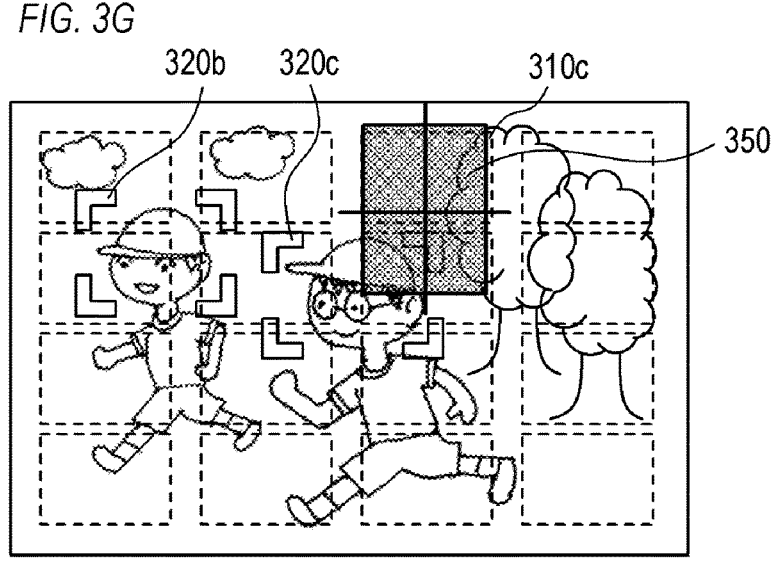
Figure 3H:
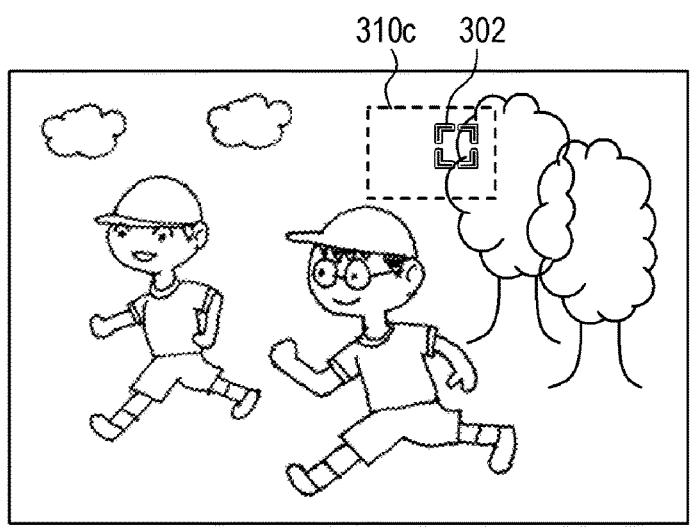

Using the display examples of FIGS. 3G and 3F, an operation that does not use the present embodiment is now described. FIG. 3G is an example in which the same LV image as in FIG. 3C is displayed and the faces of two people are detected. However, in this example, face zones corresponding to the detected face frames 320b and 320c are not set, and the default zones are maintained. When the line-of-sight confirmation button 83 is pressed in this state while the line-of-sight input position (line-of-sight pointer 350) is at exactly the same position as in FIG. 3E, the main object is determined according to the automatic-selection condition within the default zone 310c including the line-of-sight input position (center of the line-of-sight pointer 350). As a result, a part of a tree near the boundary with the sky, which is the closest object within the zone 310c and has a high contrast, is selected, and the tracking frame 302 is displayed at the position shown in FIG. 3H. In this case, even if the user intends to select the face of Person c, the line-of-sight input position cannot be precisely placed at the position of the person's face, causing an unintended position to be set as the main object. In contrast, the present embodiment enables the face of Person c to be set as the main object under the same conditions in terms of the object and the line-of-sight input position. That is, the present embodiment increases the possibility that the user's intended object is selected by specifying an approximate position by a line-of-sight input.

The various controls that are performed by the system control unit 50 in the foregoing description may be performed by a single piece of hardware. Alternatively, processes may be shared by a plurality of pieces of hardware (e.g., a plurality of processors and circuits) to control the entire device.

Some preferred embodiments of the present invention are described above in detail, but the present invention is not limited to these specific embodiments, and various embodiments within the scope of the present invention are also included in the present invention. The foregoing embodiments are merely illustrative embodiments of the present invention, and the embodiments may be combined as appropriate.

The foregoing embodiments are examples in which the present invention is applied to a digital camera, but the present invention is not limited to these examples and is applicable to any imaging device that is capable of line-of-sight detection and object detection. For example, the present invention is applicable to personal computers, PDAs, mobile phones, portable image viewers, printer devices, digital photo frames, music players, game machines, and electronic book readers. The present invention is also applicable to video players, display devices (including projection devices), tablet terminals, smartphones, AI speakers, home appliances, and in-vehicle devices.

According to the present disclosure, an imaging device is provided that is capable of selecting an object that is more suited to the photographer's intention using a line-of-sight input.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-053989, filed on Mar. 25, 2020, which is hereby incorporated by reference herein in its entirety.

What is claimed is:

1. An imaging device comprising:
an image sensor; and
at least one memory and at least one processor which function as:
an object-detecting unit configured to detect a specific type object in an image captured by the image sensor,
a line-of-sight detection unit capable of detecting a position of a line-of-sight of a photographer, and
a control unit configured to control so that:
in case where the specific type object is not detected by the object-detecting unit in the image captured by the image sensor, a main object to which a specific process should be applied is selected based on a predetermined condition within a first type zone including a line-of-sight input position detected by the line-of-sight detection unit, and
in case where the specific type object is detected by the object-detecting unit in the image captured by the image sensor, if the line-of-sight input position detected by the line-of-sight detection unit is included in a second type zone that is larger than the first type zone and includes the specific type object, the specific type object included in the second type zone corresponding to the line-of-sight input position is selected as the main object to which the specific process should be applied, regardless of the predetermined condition.

2. The imaging device according to claim 1, wherein the specific process is at least one of autofocus (AF) and tracking.

3. The imaging device according to claim 1, wherein the control unit controls to select the main object in response to an operation performed on a specific operation member.

4. The imaging device according to claim 3, wherein the specific operation member is located at a position where the specific operation member is operable with a finger of a hand holding a grip unit of the imaging device and differs from a shutter button that is operable with the finger of the hand.

5. The imaging device according to claim 1, wherein the specific type object is a human face.

6. The imaging device according to claim 1, wherein the specific type object is at least one of human eye, a face of an animal, a vehicle, and a moving object.

7. The imaging device according to claim 1, wherein the control unit controls so that in a case where a plurality of specific type objects are detected, a second type zone is set for each of the plurality of specific type objects.

8. The imaging device according to claim 7, wherein in a case where a first zone and a second zone that are second type zones and adjacent to each other are set, the control unit regards a midpoint between a center position of a specific type object detected in the first zone and a center position of a specific type object detected in the second zone, as a boundary between the first zone and the second zone.

9. The imaging device according to claim 1, wherein the second type zone is larger than a detection size of the specific type object corresponding to the second type zone.

10. The imaging device according to claim 1, wherein the predetermined condition is a condition for increasing a priority to be selected as the main object and is a condition that an object is at least one of an object that is close to the imaging device, an object that is close to a center of the image, an object having a high contrast, a moving object, and a vehicle.

11. A control method of an imaging device, comprising:
detecting a specific type object in a captured image;
detecting a position of a line-of-sight of a photographer, and
controlling so that:
in case where the specific type object is not detected in the captured image, a main object to which a specific process should be applied is selected based on a predetermined condition within a first type zone including a detected line-of-sight input position, and
in case where the specific type object is detected in the captured image, if the detected line-of-sight input position is included in a second type zone that is larger than the first type zone and includes the specific type object, the specific type object included in the second type zone corresponding to the line-of-sight input position is selected as the main object to which the specific process should be applied, regardless of the predetermined condition.

12. A non-transitory computer readable medium that stores a program, wherein the program causes a computer to execute a control method of an imaging device, the control method comprising:
detecting a specific type object in a captured image;
detecting a position of a line-of-sight of a photographer, and
controlling so that:
in case where the specific type object is not detected in the captured image, a main object to which a specific process should be applied is selected based on a predetermined condition within a first type zone including a detected line-of-sight input position, and
in case where the specific type object is detected in the captured image, if the detected line-of-sight input position is included in a second type zone that is larger than the first type zone and includes the specific type object, the specific type object included in the second type zone corresponding to the line-of-sight input position is selected as the main object to which the specific process should be applied, regardless of the predetermined condition.

* * * * *